UNITED STATES PATENT OFFICE.

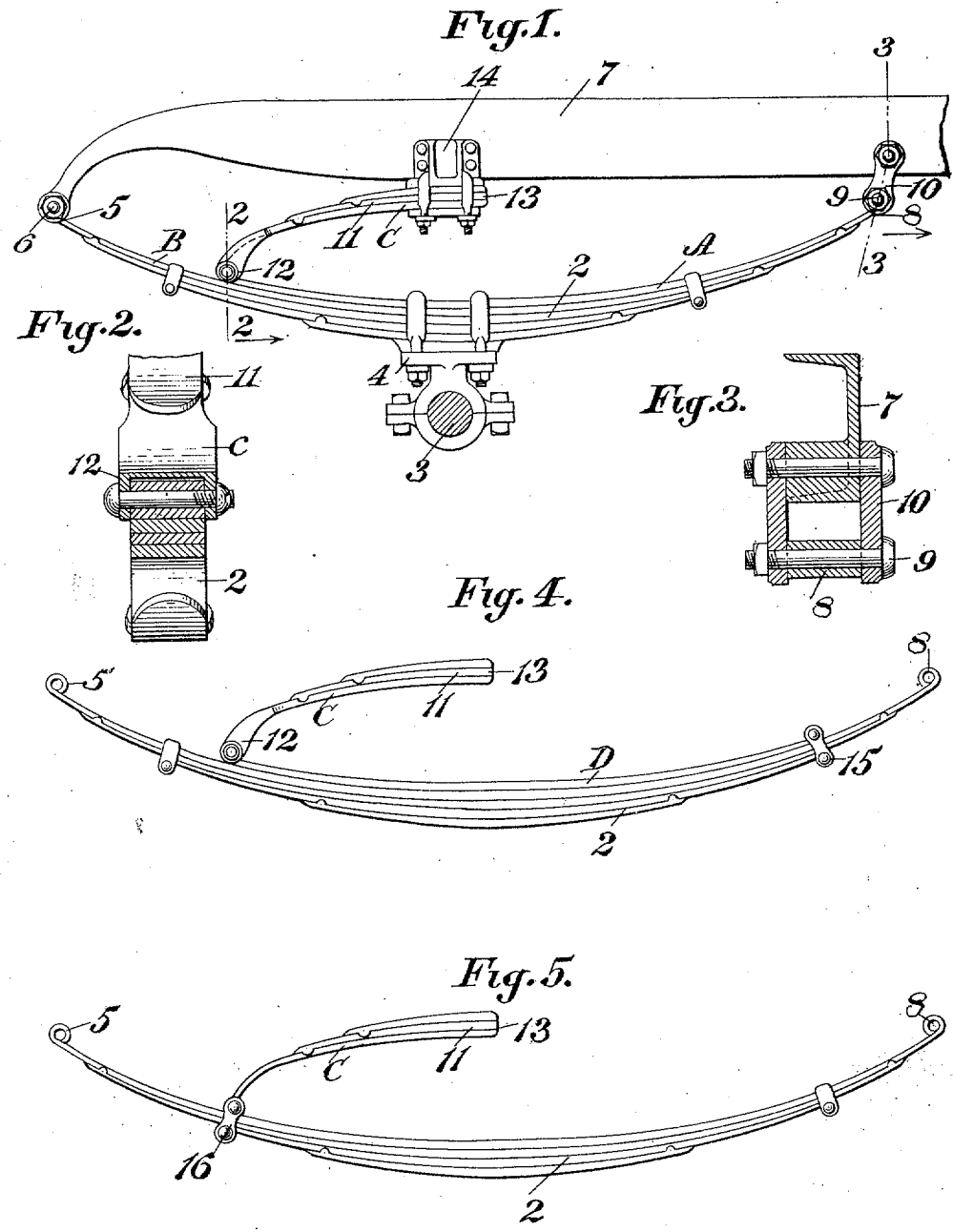

LAWRENCE HAYES, OF MONONGAHELA, PENNSYLVANIA.

VEHICLE-SPRING.

986,169.  Specification of Letters Patent.  Patented Mar. 7, 1911.

Application filed October 5, 1909. Serial No. 521,041.

*To all whom it may concern:*

Be it known that I, LAWRENCE HAYES, a resident of Monongahela, in the county of Washington and State of Pennsylvania, have invented certain new and useful Improvements in Vehicle-Springs, of which the following is a specification.

My invention relates to suspension springs for automobiles and other vehicles and its objects are to provide a simple and effective device capable of withstanding sudden and violent shocks, being interposed between the running gear and body portions of a vehicle in such manner as to absorb and prevent transmission to the body of any severe jar or vibration to which the running gear may be subjected.

A further purpose is to provide means which admit of the employment of a plurality of points of suspension for the body upon the spring members, and to provide means for interposing a varying resistance between the main spring and body of the vehicle of such a character as to admit of its being readily placed in position when the device is assembled, or easily applied to the common forms of semi-elliptic springs already in use.

A desirable embodiment of the invention is illustrated by the accompanying drawings, wherein—

Figure 1 is a side elevation of a portion of the running gear and body of an automobile having my invention applied thereto. Fig. 2 is a vertical cross section of a portion of the device, on an enlarged scale, taken on line 2—2 of Fig. 1. Fig. 3, is a similar view taken on line 3—3 of Fig. 1. Figs. 4 and 5 are side elevations of the main and supplemental springs, illustrating modifications in the construction of the supplemental spring to permit of its being readily applied to the common forms of semi-elliptic springs.

As shown in the accompanying drawings, my device consists of a main semi-elliptic leaf spring 2, which is supported upon the axle 3, being secured by clip 4, or in any other suitable manner. At the outer end of spring 2 is bearing 5 for the reception of a pivot pin 6, by means of which it is secured to the outer end of the main frame 7 of the body portion, and its inner or opposite end is formed with a similar bearing 8 for the reception of a pin 9, in the lower end of a link 10, the latter pivoted at its upper end to the vehicle frame 7 in the usual manner.

A supplemental quarter-elliptic leaf spring 11 is interposed between the main spring 2 and frame 7, and is pivotally connected at its outer or lower end 12 to the main spring, approximately midway between the clip 4 and pivot point 5, and its inner or upper end 13 is rigidly secured to the frame 7, preferably in line vertically with the axle 3, by clip 14.

With the foregoing construction it will be seen that the body member 7 is supported upon the spring members at the points 6, 13 and 8, thereby insuring a more advantageous distribution of weight upon the spring members, and in addition thereto the supplemental spring 11, will by reason of its relative location between, and method of attachment to, the body member 7 and main spring 2, offer a varying resistance to the action of said main spring, of sufficient force to prevent the latter from recoiling or reflexing with such violence as to be injured or broken when subjected to a severe shock.

In my preferred construction, as illustrated in Fig. 1, the upper leaf A of the main spring 2 is adapted to be pivotally connected at its opposite ends to the link 10 and lower end of bottom leaf C of the supplemental spring 11, and the next adjacent leaf B of the spring is extended outwardly a sufficient distance beyond the juncture of springs 2 and 11, to be pivotally connected at 6 to the outer end of frame 7. In order that the supplemental spring 11 may be applied to the ordinary forms of semi-elliptic springs already in use, it may be pivotally connected to one end of a long leaf D, adapted to be secured to the main spring 2 by means of a clip 15, as shown in Fig. 4, or in any other suitable manner, or it may be pivotally connected directly to said main spring by a clip 16, as shown in Fig. 5. The main and supplemental springs may be composed of any desired number of leaves held together in any suitable manner and the relative positions of the pivotal connection 6 and link connection 10 may be reversed without departing from the invention. The usual practice is to pivotally connect one end of the main spring directly to the frame, as at 6, and its opposite end by link 10. The pivotal connection 6 may be at the outer extremity of the frame, as here shown, or the arrangement may be reversed. But however arranged, I prefer to extend the supplemental spring toward that end of the main spring having the positive pivoted connection rather than toward the link supported end.

I claim:

1. The combination of a centrally supported upwardly bowed semi-elliptic main spring having load connections at its ends, and a quarter elliptic supplemental spring downwardly bowed with its lower extremity pivotally connected to the main spring between the center and one end of the latter and with its upper end adapted to be secured to the load intermediate the extremities of the main spring.

2. The combination of a centrally supported semi-elliptic main spring, a body member having a direct pivotal connection with one end of the main spring, a link providing a swinging connection between the body member and the other end of the spring, and a quarter-elliptic supplemental spring secured at one end to the body member between the ends of the main spring, said supplemental spring extending toward that end of the main spring having direct pivotal connection with the body member and pivotally secured to the main spring intermediate said end of the latter and the main spring support.

3. The combination of a semi-elliptic main spring having load connections at its ends, spring supporting means, and a quarter-elliptic supplemental spring having one end secured to the main spring intermediate one end of the latter and the point of support of the main spring, the opposite end of the supplemental spring secured to the load intermediate the connections between the load and the main spring extremities.

4. The combination of a semi-elliptic main spring having load connections at its ends, spring supporting means, and a quarter-elliptic spring formed of a plurality of leaves with said leaves superposed one upon the other at the upper end of said spring with means securing said spring end to the load intermediate the main spring extremities, the lowermost and longest leaf of the supplemental spring having its lower extremity pivotally connected to the main spring inwardly from one end of the latter.

5. The combination of a main spring composed of a plurality of leaves, the leaf having the greatest extension at one end of the spring terminating short of the opposite extremity of the spring and providing a bearing, and a relatively short supplemental leaf spring at one end secured to said bearing with its opposite end and the extremities of the main spring secured to the load.

In testimony whereof I affix my signature in presence of two witnesses.

LAWRENCE HAYES.

Witnesses:
F. E. GAITHER,
J. M. NESBIT.